(12) United States Patent
Choi et al.

(10) Patent No.: US 7,362,756 B2
(45) Date of Patent: Apr. 22, 2008

(54) FAST HANDOFF METHOD WITH COA PRE-RESERVATION AND ROUTING IN USE OF ACCESS POINT IN WIRELESS NETWORKS

(75) Inventors: Jin-hyeock Choi, Suwon-si (KR);
Youn-hee Han, Guri-si (KR);
Xiao-ming Wang, Yongin-si (KR);
Hee-jin Jang, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 606 days.

(21) Appl. No.: 10/960,921

(22) Filed: Oct. 12, 2004

(65) Prior Publication Data

US 2005/0078635 A1  Apr. 14, 2005

(30) Foreign Application Priority Data

Oct. 13, 2003 (KR) .................. 10-2003-0071070

(51) Int. Cl.
*H04L 12/56* (2006.01)
(52) U.S. Cl. .............. 370/389; 370/331; 370/392; 455/436; 455/432.1; 455/435.1
(58) Field of Classification Search .......... 370/331, 370/349, 420, 392, 395.3, 390, 328, 310, 370/401, 389, 428, 381, 471, 338, 352, 329, 370/378, 393, 394; 455/412.1, 418, 557, 455/436, 442, 422.1, 456.5, 456.6, 556.2, 455/419–420, 186.1, 432.1, 455.1, 439.452, 455/424, 425, 550.1, 575.1; 709/217; 717/100, 717/165, 164, 168
See application file for complete search history.

(56) References Cited

U.S. PATENT DOCUMENTS

| | | | |
|---|---|---|---|
| 6,366,561 B1 * | 4/2002 | Bender | 370/238 |
| 6,487,406 B1 * | 11/2002 | Chang et al. | 455/422.1 |
| 7,120,131 B2 * | 10/2006 | Seppala et al. | 370/310 |
| 2002/0006133 A1 * | 1/2002 | Kakemizu et al. | 370/401 |
| 2002/0131386 A1 * | 9/2002 | Gwon | 370/338 |
| 2002/0178235 A1 * | 11/2002 | Ueno et al. | 709/217 |
| 2003/0018810 A1 * | 1/2003 | Karagiannis et al. | 709/238 |
| 2003/0026230 A1 * | 2/2003 | Ibanez et al. | 370/338 |
| 2003/0091030 A1 * | 5/2003 | Yegin et al. | 370/352 |
| 2003/0142642 A1 * | 7/2003 | Agrawal et al. | 370/328 |

(Continued)

Primary Examiner—Edward F. Urban
Assistant Examiner—Charles Chow
(74) Attorney, Agent, or Firm—Staas & Halsey LLP

(57) ABSTRACT

A fast handoff method of an Access Router includes receiving and storing at an Access Point a Router Advertisement message periodically sent from the Access Router to which the Access Point is connected, the Access Point being connected to at least one mobile node in wireless manner and supporting services to the at least one mobile node; generating at least one Care-of Address (CoA) at the Access Point, performing Duplicate Address detection, and storing the CoAs for which the Duplicate Address detection is successfully completed; forming, when a new mobile node enters a service-available range of the Access Point, a link to the new mobile node at the Access Point, including any of the stored CoAs in the Router Advertisement message, and sending the Router Advertisement message including the stored CoA to the new mobile node; and communicating the new mobile node to a network using the CoA included in the sent Router Advertisement message.

30 Claims, 4 Drawing Sheets

U.S. PATENT DOCUMENTS

| | | | |
|---|---|---|---|
| 2003/0179750 A1* | 9/2003 | Hasty et al. | 370/390 |
| 2004/0013111 A1* | 1/2004 | Faccin | 370/378 |
| 2004/0081122 A1* | 4/2004 | Koodli et al. | 370/329 |
| 2004/0111483 A1* | 6/2004 | Watanabe | 709/207 |
| 2004/0165565 A1* | 8/2004 | Omae et al. | 370/338 |
| 2004/0179489 A1* | 9/2004 | Suzuki et al. | 370/328 |
| 2004/0203596 A1* | 10/2004 | Sreemanthula et al. | 455/411 |
| 2004/0208144 A1* | 10/2004 | Vinayakray-Jani | 370/331 |
| 2004/0218573 A1* | 11/2004 | Takahashi et al. | 370/338 |
| 2004/0240445 A1* | 12/2004 | Shin et al. | 370/389 |
| 2004/0246931 A1* | 12/2004 | Thubert et al. | 370/338 |
| 2004/0252653 A1* | 12/2004 | Shimizu et al. | 370/310 |
| 2005/0036471 A1* | 2/2005 | Singh et al. | 370/338 |
| 2005/0088993 A1* | 4/2005 | Jung et al. | 370/331 |
| 2005/0099971 A1* | 5/2005 | Droms et al. | 370/328 |
| 2005/0128969 A1* | 6/2005 | Lee et al. | 370/313 |
| 2006/0056369 A1* | 3/2006 | Morishige et al. | 370/338 |
| 2006/0062214 A1* | 3/2006 | Ng et al. | 370/389 |
| 2007/0115883 A1* | 5/2007 | Narayanan et al. | 370/331 |

* cited by examiner

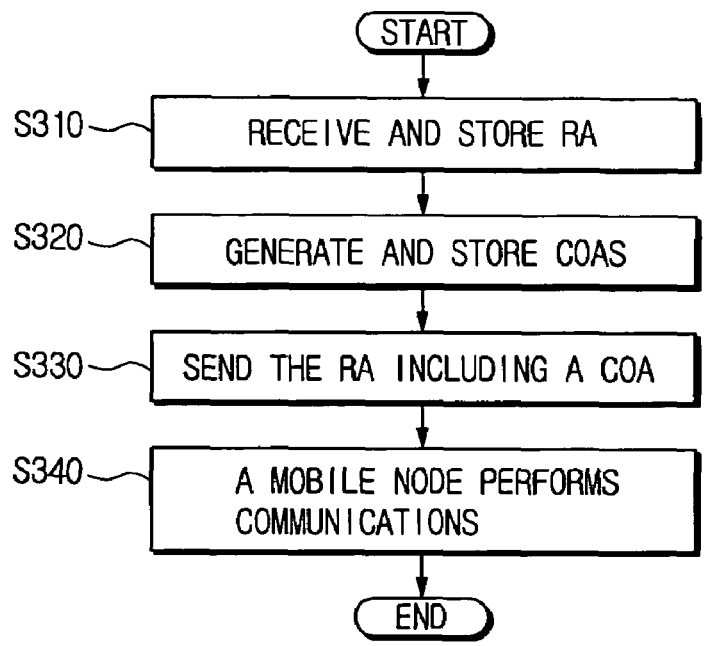
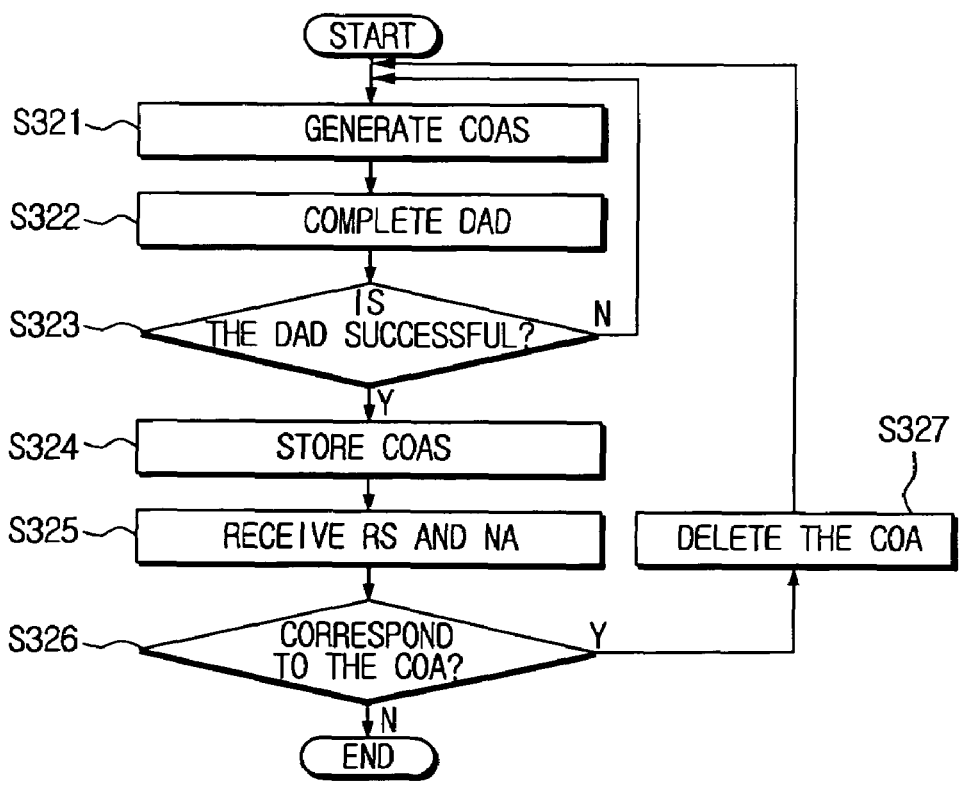

FAST HANDOFF METHOD WITH COA PRE-RESERVATION AND ROUTING IN USE OF ACCESS POINT IN WIRELESS NETWORKS

CROSS-REFERENCE TO RELATED APPLICATION

This application claims the priority of Korean Patent Application No. 2003-71070, filed on Oct. 13, 2003, in the Korean Intellectual Property Office, the disclosure of which is incorporated herein by reference.

BACKGROUND OF THE INVENTION

1. Field of the Invention

The present invention relates to a fast handoff method with (CoA) Care-of Address pre-reservation and routing in use of an access point in a wireless network, and more particularly to a fast handoff method using an access point capable of receiving a Router Advertisement (RA) message including a pre-reserved (CoA) Care-of Address by the access point reducing handoff time when a mobile terminal moves from one network to another network.

2. Description of the Related Art

The number of wireless Internet users has increased rapidly recently, together with widespread Internet use, fast development in wireless communication technologies and mobile terminals such as portable computers and Personal Digital Assistants (PDAs). The mobile terminals under the wireless Internet environment move anytime to different places changing network access positions. Such mobile terminals are referred to as mobile nodes.

In order for a mobile node to perform wireless Internet communications, Internet services should be secured in as much a high quality as a home network even when the mobile node moves to a foreign network beyond its own home network. Diverse technologies have been proposed to provide stable wireless Internet services even when the mobile node changes network access positions.

In particular, the Internet Engineering Task Force (IETF) mobile IP working group has proposed a method in which all mobile terminals continuously use a specific identifier referred to as 'IP address' regardless of network access positions, and continues work for defining a protocol for mobile IP and complementing a drawback to the protocol. Furthermore, in order to solve a problem that the existing IPv4 system becomes insufficient to accommodate increasing address demands, the mobile IPv6 technology is being introduced to provide wireless Internet services in use of the IPv6 protocol.

According to the mobile IPv6 technology, a mobile node communicates with a correspondent node (CN) in use of its own home address (HA) through a home agent which is a router having its own registration information even though it moves to a foreign network. To do this, if the mobile node is linked to a foreign network, the mobile node is assigned a CoA which is a temporary address from an access router of the foreign network, and registers the assigned CoA to the home agent with a home address.

Therefore, as the mobile node moves to a new network, three operations are taken for mobile node movement detection: CoA configuration, duplicate address detection (DAD), and the binding process by sending to a home agent and a correspondent node a binding update message including the CoA. These operations cause handoff delays and packet losses and, in particular, degrade the quality of services (QoS) requiring real-time transmissions.

In the meantime, in order for an Access Point (AP) to provide its services under the wireless LAN environment, a mobile node has to be in its service-available range, and, if the mobile node is out of the service-available range, the mobile node has to receive the services from a new Access Point (AP). As above, if a mobile node moves from one network to a different network, the aforementioned three steps for the handoff are required.

FIG. 1 shows a mobile node belonging to one network moving to a different network under the general wireless LAN environment.

According to the mobile lPv6, if a mobile node (MN) belonging to a network A moves to a network B which is controlled by a new Access Router, the mobile node has to establish a layer-2 association. That is, the mobile node needs to complete the link-layer attachment, receive a Router Advertisement (RA) message from a new Access Router during a process for layer-3 handoff, and perform movement detection.

Subsequently, the mobile node generates a new CoA using network prefix information included in an RA message and its own Link-Layer Address (LLA) and performs Duplicate Address Detection (DAD).

FIG. 2 is a flow chart showing a process of receiving an RA message from a new Access Router, configuring a CoA, and performing the Duplicate Address Detection, when a mobile node belonging to one network moves to a different network in the prior art.

If a mobile node moves to a different network (S210), the mobile node sends an Association Request message to an Access Point (AP) for a link to the Access Point, and receives an Association Response message when services can be supported by the Access Point, to thereby complete Link-Layer attachment (S215).

After the mobile node completes the Link-Layer attachment, the mobile node waits for an RA message to be received from an Access Router (AR) of the network (S220). For this, the mobile node can multicast a Router Solicitation (RS) message to the whole network.

The Access Router periodically receives the RS message, for example, every three seconds, and sends the RA message (S225). Thus, at worst, the mobile node can miss its movement for three seconds.

The RA message provides network prefix information. Therefore, a mobile node obtains a new network prefix from the received RA message, and is notified of its own Access Router. The mobile node generates a new CoA using the network prefix information and its own Link-Layer Address (S230).

Next, the mobile node multicasts to its newly linked network a Neighbor Solicitation (NS) message including the generated CoA and its own Link-Layer address, and starts performing the Duplicate Address Detection (S235).

The Duplicate Address Detection becomes successful when the mobile node does not receive the Neighbor Advertisement (NA) notifying of address duplication in a predetermined limited time, and the corresponding CoA is recognized as a unique CoA, so the mobile node performs communications in use of the CoA (S235). The predetermined limited time is 1000 ms by default.

However, if there is a node using the corresponding CoA in advance, the node sends to the mobile node the Neighbor Advertisement including its own Link-Layer address in response to the Neighbor Solicitation message (the DAD failed). Accordingly, the mobile node randomly generates an ID for a corresponding interface to obtain a new CoA (S230), and performs the Duplicate Address Detection again for the generated CoA (S235). If a unique CoA cannot be obtained after the Duplicate Address Detection is consecutively performed five times, the mobile node gives up communications under the corresponding foreign network and waits until a link is changed.

As described above, according to the conventional mobile IPv6 protocol, a mobile node has to wait a certain time to receive a Router Advertisement message and recognize a router to which the mobile node belongs, when the mobile node is to have access to a new Access Router. Further, undesired delays occur since the mobile node has to wait for a response message even when the mobile node immediately sends a Router Solicitation message.

Since the mobile node generates a CoA and performs Duplicate Address Detection after receiving a Router Advertisement message, some time is spent when the Duplicate Address Detection is successfully completed, and more time is spent when the Duplicate Address Detection fails.

Accordingly, a considerable packet loss occurs since the mobile node cannot perform normal communications during the time which the handoff is delayed. In particular, when the mobile node sends real-time data under the mobile IP environment, the data loss occurring during such a delay time causes a serious problem securing the quality of services.

Therefore, efforts have been made to reduce the time it takes to receive a Router Advertisement and the DAD performance time.

SUMMARY OF THE INVENTION

The present invention solves the above and/or other drawbacks and other problems associated with the conventional arrangement. According to an aspect of the present invention there is provided a fast handoff method using Access Points in a wireless network capable of reducing a delay time occurring during a process for a mobile node to register itself to a new Access Router, generate a CoA, and perform Duplicate Address Detection as the mobile node is in handoff.

The foregoing and/or other objects and advantages are substantially realized by providing a fast handoff method in use of an Access Router according to the present invention, which includes receiving and storing at an Access Point a Router Advertisement message periodically sent from the Access Router to which the Access Point is connected, the Access Point being connected to at least one mobile node in a wireless manner and supporting services to the mobile node; generating at least one Care-of Address (CoA) at the Access Point, performing Duplicate Address detection, and storing the CoAs for which the Duplicate Address detection is successfully completed; forming, when a new mobile node enters a service-available range of the Access Point, a link to the new mobile node by the Access Point, including any of the stored CoAs in the Router Advertisement message, and sending the Router Advertisement message to the new mobile node including the stored CoA; and communicating the new mobile node to a network using the CoA included in the sent Router Advertisement message.

According to an aspect of the present invention, the Router Advertisement message storage operation periodically receives the Router Advertisement message sent from the Access Router and updates the stored Router Advertisement message.

According to an aspect of the present invention, the Router Advertisement message storage operation does not store the Router Advertisement message when the Router Advertisement message is required by a specific mobile node.

According to an aspect of the present invention, the CoA storage operation generates the CoAs including a network prefix of a network to which the Access Router belongs and a random number, and the CoA storage operation tabulates and stores the predetermined number of CoAs.

According to an aspect of the present invention, the CoA storage operation deletes a stored CoA and generates a new CoA when a different mobile node is to use the same address as the stored CoA.

According to an aspect of the present invention, the sending of the router advertisement establishes a destination IP address as a multicast address and a destination Link-Layer address as a Link-Layer address of the mobile node, and sends the Router Advertisement message.

According to an aspect of the present invention, the communications performance operation extracts a network prefix included in the received Router Advertisement message, and does not use the sent CoA when the network prefix is not changed.

According to another aspect of the present invention, there is provided a computer readable medium encoded with processing instructions performing a fast handoff method in an Access Router, the method including receiving and storing at an Access Point a Router Advertisement message periodically sent from the Access Router to which the Access Point is connected, the Access Point also being connected to at least one mobile node in a wireless manner and supporting services to the at least one mobile node; generating at least one Care-of Address (CoA) at the Access Point, performing Duplicate Address detection, and storing the CoAs for which the Duplicate Address detection is successfully completed; forming, when a new mobile node enters a service-available range of the Access Point, a link to the new mobile node at the Access Point, selecting any of the at least one stored CoAs, and sending the Router Advertisement message and the selected CoA to the new mobile node; and communicating the new mobile node to a network using the CoA included in the sent Router Advertisement message.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 3 is a flow chart showing a fast handoff method with CoA pre-reservation and routing in use of an Access Point according to an embodiment of the present invention;

FIG. 4 is a flow chart showing in detail a process for CoA generation and storage of FIG. 3;

DETAILED DESCRIPTION OF THE EMBODIMENTS

Figure 1:
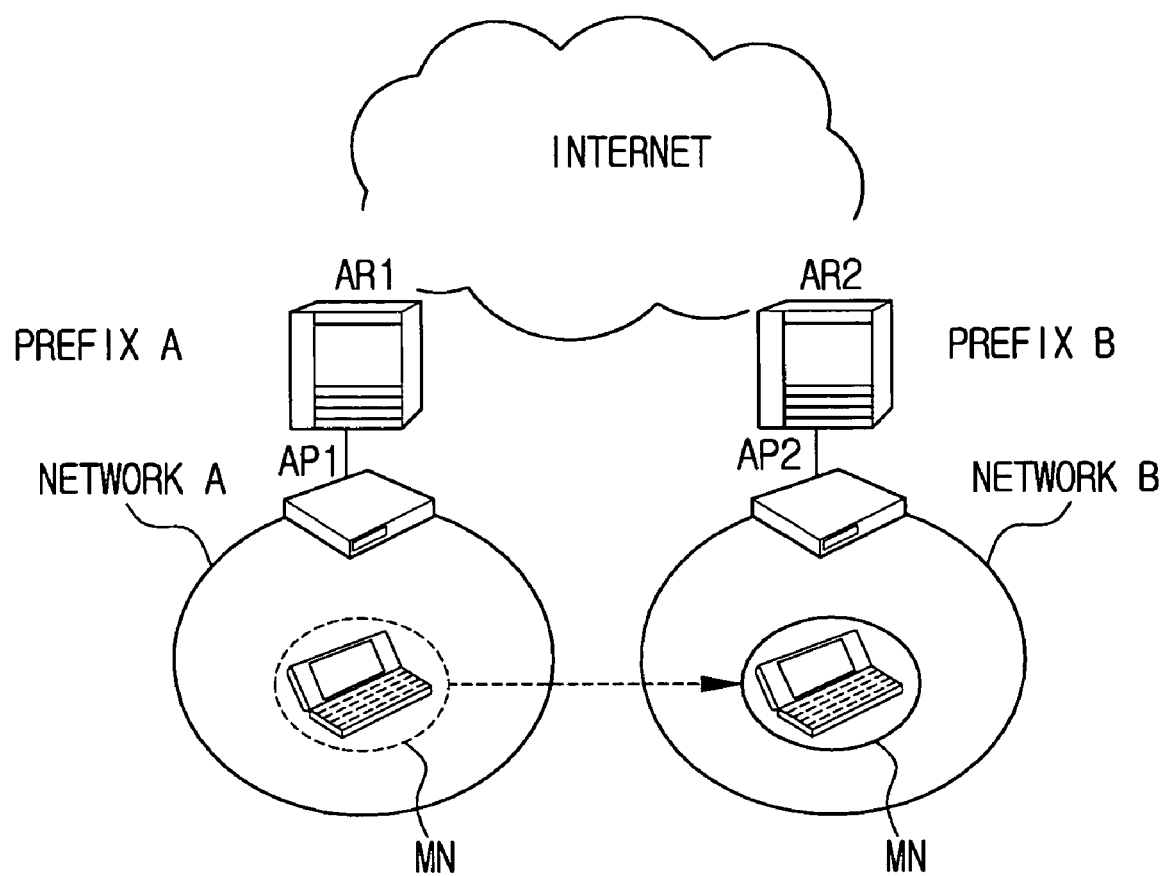
FIG. 1 is a view showing a mobile node belonging to one network moving to a different network in a general wireless LAN environment.
Figure 2:
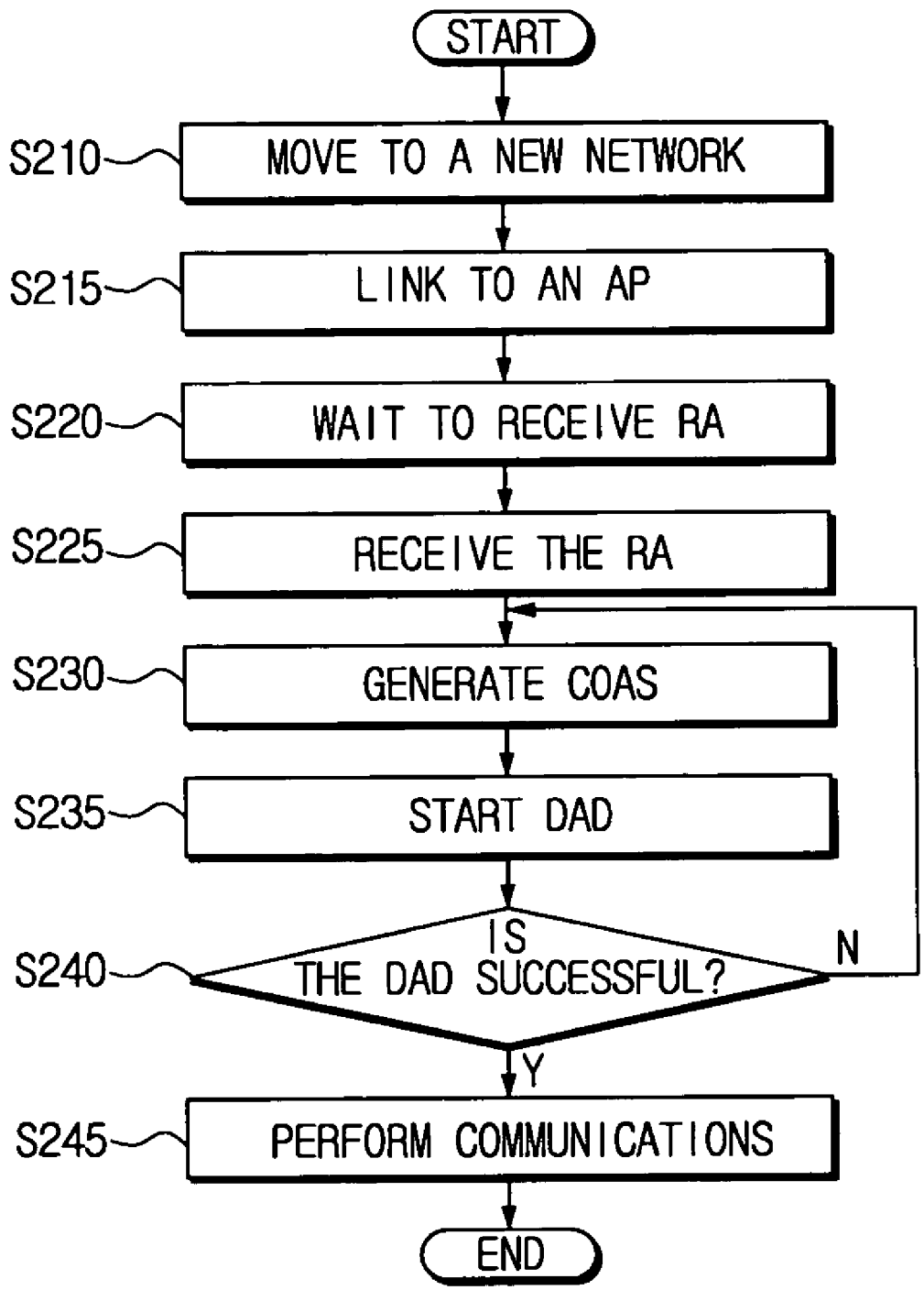
FIG. 2 is a flow chart showing a process for a mobile node to receive a Router Advertisement (RA) message from a new Access Router, configure a CoA, and perform Duplicate Address Detection, when a mobile node belonging to one network moves to a different network according to the prior art.

Reference will now be made in detail to the embodiments of the present invention, examples of which are illustrated in the accompanying drawings, wherein like reference numerals refer to the like elements throughout. The embodiments are described below to explain the present invention by referring to the figures. The matters defined in the description such as a detailed construction and elements are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

FIG. 3 is a flow chart showing a fast handoff method using an Access Point in the wireless network according to an embodiment of the present invention.

Referring to FIG. 3, an Access Point receives and stores Router Advertisement (RA) periodically sent from an Access Router (S310). If the Access Point receives the Router Advertisement sent from the Access Router, the Access Point updates the previously stored Router Advertisement to the newly received Router Advertisement for storage.

To do this, the Access Point scans the header of a frame received from the Access Router, and checks whether the received frame is a broadcast message. If the received frame is the broadcast message, the Access Point checks whether Router Advertisement is included, and, if the Router Advertisement is included, checks whether the Router Advertisement is an unsolicited Router Advertisement message. If the Router Advertisement is the unsolicited Router Advertisement message, the Access Point recognizes and stores the unsolicited Router Advertisement message as Router Advertisement that can be assigned to a new mobile node.

However, if the Router Advertisement is not included nor the received frame is the broadcast message, the Access Point sends a corresponding downlink packet to a specific node. Further, if the Router Advertisement is not the unsolicited Router Advertisement message, that is, if the Router Advertisement is the solicited Router Advertisement message requested by a specific mobile node in the network, the Access Point sends a downlink packet to a specific node.

Next, the Access Point generates a CoA, performs Duplicate Address Detection, and stores a determined CoA (S320).

FIG. 4 is a flow chart showing in detail operation S320 of generating and storing the CoA of FIG. 3. In FIG. 4, the Access Point generates a CoA using a prefix of a network to which the Access Router belongs (S321). That is, using a network prefix included in the Router Advertisement received from the Access Router and stored in the access point, the Access Point configures an upper portion of an address with the network prefix and a lower portion of the same with random numbers, to thereby generate the CoA.

The Access Point performs Duplicate Address Detection with respect to the generated CoA (S322). If the Duplicate Address Detection operation is successfully completed and the address is secured as unique ("Y" of operation S323), the Access Point stores the CoA secured as unique (S324). It is preferable that the Access Point maintains a predetermined number of stored CoAs. That is, the Access Point configures a pool of the predetermined number of CoAs, and, if the pool of the predetermined number of the stored CoAs is not formed for any reason, the Access Point generates and stores the CoAs up to the predetermined number. Therefore, if the stored CoAs are assigned to or deleted from the mobile nodes, the Access Point generates CoAs again based on the above operations.

Even if the Duplicate Address Detection operation is successfully completed, the Access Point checks subsequently received Neighbor Solicitation and Neighbor Advertisement to secure the stored CoAs as unique (S325). That is, if a different node in the network uses the same CoA as a stored CoA after the Duplicate Address Detection operation is completed, the stored CoA cannot be allocated to a mobile node to have new access to the network, since the stored CoA lost the uniqueness.

Therefore, the Access Point checks the Neighbor Solicitation and the Neighbor Advertisement received after the successful Duplicate Address Detection with respect to a generated CoA, and checks whether there is a node that has used the same CoA as a stored CoA or that is requesting the same CoA for use.

If it is checked that a mobile node has used or requests a reserved CoA, that is, if an address of a target option of the Neighbor Solicitation and Neighbor Advertisement corresponds to a reserved CoA ("Y" of operation S326), the Access Point deletes the corresponding CoA (S327), and randomly generates a new CoA in the above manner and performs the Duplicate Address Detection again. Accordingly, the uniqueness of the reserved CoA can be secured all the time.

The Access Point forms a link with the new mobile node, includes a stored CoA in a stored Router Advertisement message, and sends the Router Advertisement message to the new mobile node (S330).

Figure 5:
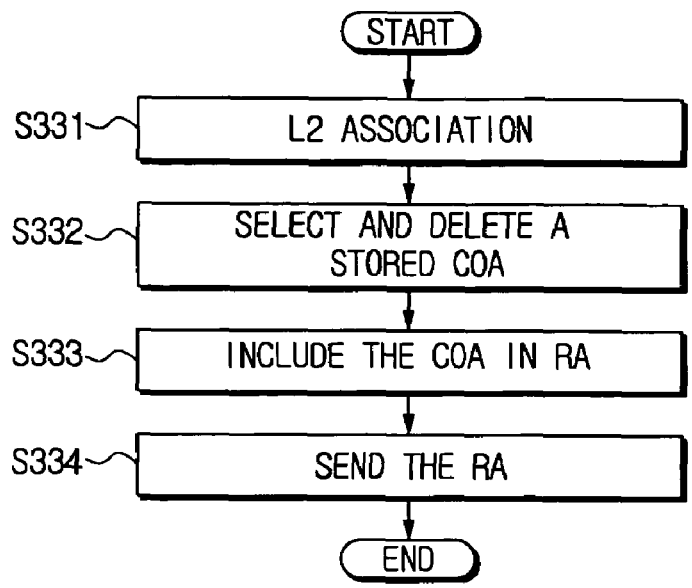
FIG. 5 is a flow chart showing in detail a process for sending Router Advertisement inclusive of the CoA in FIG. 3.

FIG. 5 is a flow chart showing in detail the operation of including the CoA in the Router Advertisement and sending the Router Advertisement in FIG. 3. In FIG. 5, if a new mobile node enters a service range of a new Access Router and establishes a link with an Access Point (S331), the Access Point selects one CoA from the pool of stored CoAs, and deletes the selected CoA from the pool (S332).

In the meantime, the Access Point includes the selected CoA in the stored Router Advertisement to directly reconfigure a Router Advertisement (S333). In this occasion, a secure channel is already formed between the Access Point and the Access Router to enable the Access Router to directly add a CoA to the Router Advertisement, to thereby guarantee not to violate security. Therefore, the Access Point adds an option including the CoA, and calculates an IP checksum value again.

Next, the Access Point sends the reconfigured Router Advertisement to the new mobile node (S334). In this occasion, a destination IP address of the Router Advertisement is established as a multicast address, and a destination Link-Layer address is established as a Link-Layer address of the mobile node recognized during Link-Layer connection. This is to prevent the IP address from being discarded in the Layer 3 by establishing the IP address as the multicast address, since the Access Point does not know the IP address of the mobile node at the time when sending the Router Advertisement. Further, since the Link-Layer address of the destination is the Link-Layer address of the new mobile node, the other nodes cannot receive the Router Advertisement.

Since the Access Point uses one reserved address, the Access Point generates a new CoA, performs the Duplicate Address Detection of the generated CoA, and reserves a new address to maintain the pool of the predetermined number of CoAs.

The mobile node communicates with the network using the CoA included in the sent Router Advertisement (S340).

Figure 6:
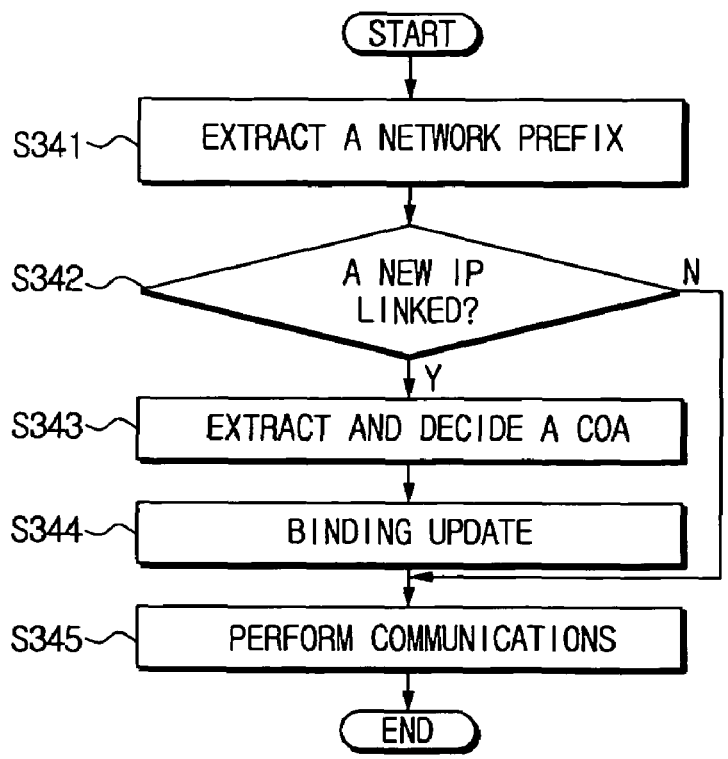
FIG. 6 is a flow chart showing in detail a process for the mobile node to perform communications in a network in use of the CoA included in the received RA in FIG. 3.

FIG. 6 is a flow chart showing a process for a mobile node to communicate with the network using the CoA included in a received Router Advertisement of FIG. 3.

If a mobile node receives Router Advertisement including the CoA, the mobile node extracts a network prefix from the received Router Advertisement (S341). Since plural Access Points can exist in one network, the mobile node does not have to change networks even though it is linked to a different Access Point, and the mobile node can communicate with the existing CoA as if it has the same Access Point linked. Therefore, the mobile node compares the network prefixes, and decides whether it is linked to a new network (S342).

If the mobile node is linked to the new network, the mobile node extracts the CoA from the Router Advertisement and makes the extracted CoA a new CoA, sends a binding update to a Home Agent and a Correspondent Node (S344), and restarts communications (S345).

The present invention has an Access Point generate and reserve a CoA in advance, and immediately send Router Advertisement including the CoA when a mobile node moves from one network to a different network in the IPv6 environment, thereby reducing time delay for performing mobility detection and Duplicate Address Detection so as to be able to support much faster handoff than the existing mobile IPv6.

Accordingly, the present invention can rapidly register the mobile node to a new Access Router and reduce delay time that can occur during a process for performing the Duplicate Address Detection when the handoff of the mobile node occurs, thereby reducing the loss rate and delay rate of packets sent from a Home Agent and a Correspondent Node which occur during the handoff so as to be capable of improving the quality of communications in mobile environments.

The aforementioned fast handoff method may be embodied as a computer program that can be run by a computer, which can be a general or special purpose computer. Thus, it is understood that the access router can be such a computer. Computer programmers in the art can easily reason codes and code segments, which constitute the computer program. The program is stored in a computer readable medium readable by the computer. When the program is read and run by a computer, the fast handoff method is performed. Here, the computer-readable medium may be a magnetic recording medium, an optical recording medium, a carrier wave, firmware, or other recordable media.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A fast handoff method of an Access Router, comprising:
receiving and storing at an Access Point a Router Advertisement message periodically sent from the Access Router to which the Access Point is connected, the Access Point also being connected to at least one mobile node in a wireless manner and supporting services to the mobile node;
generating at least one Care-of Address (CoA) at the Access Point, performing Duplicate Address detection, and storing the CoAs for which the Duplicate Address detection is successfully completed;
forming, when a new mobile node enters a service-available range of the Access Point, a link to the mobile node at the Access Point, including any of the stored CoAs into the Router Advertisement message, and sending the Router Advertisement message including the stored CoAs to the new mobile node; and
communicating the new mobile node to a network using the CoA included in the sent Router Advertisement message.

2. The fast handoff method as claimed in claim 1, wherein the Router Advertisement message sent from the Access Router is periodically received and updated at the Access Point.

3. The fast handoff method as claimed in claim 1, wherein the Router Advertisement message is not stored at the Access Point when the Router Advertisement message is required by a specific mobile node.

4. The fast handoff method as claimed in claim 1, wherein the generated CoAs include a network prefix of the network to which the Access Router belongs and a random number.

5. The fast handoff method as claimed in claim 1, wherein the storing of the CoAs includes tabulating and storing a predetermined number of CoAs.

6. The fast handoff method as claimed in claim 1, wherein the storing of the CoAs includes deleting a stored CoA and generating a new CoA when a different mobile node is to use the same address as the stored CoA.

7. The fast handoff method as claimed in claim 1, wherein in the sending of the router advertisement message a destination IP address of the Router Advertisement message is established as a multicast address and a destination Link-Layer address is established as a Link-Layer address of the mobile node, and the Router Advertisement message is sent.

8. The fast handoff method as claimed in claim 1, wherein in the communicating of the new mobile node to the network, a network prefix included in the received Router Advertisement message is extracted, and the sent CoA is not used when the network prefix is not changed.

9. The fast handoff method as claimed in claim 1, wherein the Access point checks subsequently received Neighbor Solicitation and Neighbor Advertisement to secure the stored CoAs.

10. The fast handoff method as claimed in claim 1, wherein when the at least one mobile node enters a service range of a new Access Router and establishes a new link with a new Access Point, the new Access Point selects one new CoA from a pool of stored new CoAs, and deletes the selected new CoA from the pool.

11. The fast handoff method as claimed in claim 2, wherein when updating the stored Router Advertisement message, the Access Point scans a header of a frame received from the Access Router, and checks whether the receive frame is a broadcast message, and if determined as the broadcast message, the Access Point checks whether Router Advertisement is included.

12. The fast handoff method as claimed in claim 11, wherein if the Router Advertisement is included, the Access Point checks whether the Router Advertisement is an unsolicited Router Advertisement message, and if determined as the unsolicited Router Advertisement message, the Access Point recognizes and stores the unsolicited Router Advertisement message as the Router Advertisement to be assigned to the new mobile node.

13. A computer readable medium encoded with processing instructions performing a fast handoff method in an Access Router, the method comprising:

receiving and storing at an Access Point a Router Advertisement message periodically sent from the Access Router to which the Access Point is connected, the Access Point also being connected to at least one mobile node in a wireless manner and supporting services to the at least one mobile node;

generating at least one Care-of Address (CoA) at the Access Point, performing Duplicate Address detection, and storing the CoAs for which the Duplicate Address detection is successfully completed;

forming, when a new mobile node enters a service-available range of the Access Point, a link to the new mobile node at the Access Point, including any of the at least one stored CoAs in the Router Advertisement message, and sending the Router Advertisement message having the CoA to the new mobile node; and communicating the new mobile node to a network using the CoA included in the sent Router Advertisement message.

14. The computer readable medium as claimed in claim 13, wherein the Router Advertisement message sent from the Access Router is periodically received and updated at the Access Point.

15. The computer readable medium as claimed in claim 13, wherein the Router Advertisement message is not stored at the Access Point when the Router Advertisement message is required by a specific mobile node.

16. The computer readable medium as claimed in claim 13, wherein the generated CoAs include a network prefix of the network to which the Access Router belongs and a random number.

17. The computer readable medium as claimed in claim 13, wherein the storing of the CoAs includes tabulating and storing a predetermined number of CoAs.

18. The computer readable medium as claimed in claim 13, wherein the storing of the CoAs includes deleting a stored CoA and generating a new CoA when a different mobile node is to use the same address as the stored CoA.

19. The computer readable medium as claimed in claim 13, wherein in the sending of the router advertisement message a destination IP address of the Router Advertisement message is established as a multicast address and a destination Link-Layer address is established as a Link-Layer address of the mobile node, and the Router Advertisement message is sent.

20. The computer readable medium as claimed in claim 13, wherein in the communicating of the new mobile node to the network, a network prefix included in the received Router Advertisement message is extracted, and the sent CoA is not used when the network prefix is not changed.

21. The computer readable medium as claimed in claim 13, wherein the Access point checks subsequently received Neighbor Solicitation and Neighbor Advertisement to secure the stored CoAs.

22. The computer readable medium as claimed in claim 13, wherein when the at least one mobile node enters a service range of a new Access Router and establishes a new link with a new Access Point, the new Access Point selects one new CoA from a pool of stored new CoAs, and deletes the selected new CoA from the pool.

23. The computer readable medium as claimed in claim 14, wherein when updating the stored Router Advertisement message, the Access Point scans a header of a frame received from the Access Router, and checks whether the receive frame is a broadcast message, and if determined as the broadcast message, the Access Point checks whether Router Advertisement is included.

24. The computer readable medium as claimed in claim 23, wherein if the Router Advertisement is included, the Access Point checks whether the Router Advertisement is an unsolicited Router Advertisement message, and if determined as the unsolicited Router Advertisement message, the Access Point recognizes and stores the unsolicited Router Advertisement message as the Router Advertisement to be assigned to the new mobile node.

25. The fast handoff method as claimed in claim 1, wherein the Access Point sends a reconfigured Router Advertisement to the new mobile node and a destination IP address of the Router Advertisement is established as a multicast address, and a destination Link-Layer address is established as the Link-Layer of the new mobile node recognized during a Link-Layer connection.

26. The fast handoff method as claimed in claim 25, wherein the Link-Layer address of a destination is the Link-Layer address of the new mobile node, and the other mobile nodes cannot receive the Router Advertisement.

27. The fast handoff method as claimed in claim 1, wherein the Access Point uses one reserved address, and the Access Point generates a new CoA, performs the Duplicate Address Detection of the new generated CoA, and reserves a new address to maintain a pool of predetermined number of CoAs.

28. The fast handoff method as claimed in claim 1, wherein the mobile node compares network prefixes, and determines whether the mobile node is linked to a new network.

29. The fast handoff method as claimed in claim 28, wherein the mobile node extracts the CoA from the Router Advertisement and makes the extracted CoA a new CoA sends a binding update to a Home Agent and a Correspondent Node, and restarts communications with the network.

30. A fast handoff method of an Access Router, comprising:

receiving and storing at an Access Point a Router Advertisement message periodically sent from the Access Router to which the Access Point is connected, the Access Point also being connected to at least one mobile node in a wireless manner supporting services to the mobile node;

generating at least one Care-of Address (CoA) at the Access Point, performing Duplicate Address Detection, and storing the CoAs for which the Duplicate Address detection is successfully completed, wherein the Access Point generates and stores the CoAs in advance, and sends a Router Advertisement including the stored CoAs to the mobile node when the mobile node moves from one network to a different network.

* * * * *

UNITED STATES PATENT AND TRADEMARK OFFICE
CERTIFICATE OF CORRECTION

| | |
|---|---|
| PATENT NO. | : 7,362,756 B2 |
| APPLICATION NO. | : 10/960921 |
| DATED | : April 22, 2008 |
| INVENTOR(S) | : Jin-hyeock Choi et al. |

It is certified that error appears in the above-identified patent and that said Letters Patent is hereby corrected as shown below:

Column 10, Line 43, after "new CoA" insert --,--.

Signed and Sealed this

Sixteenth Day of September, 2008

JON W. DUDAS
*Director of the United States Patent and Trademark Office*